(12) United States Patent
Sundresh

(10) Patent No.: US 7,526,751 B2
(45) Date of Patent: Apr. 28, 2009

(54) MACROSCOPIC MODEL FOR LARGE SCALE SOFTWARE SYSTEM AND ITS BEHAVIOR

(75) Inventor: Tippure S. Sundresh, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 583 days.

(21) Appl. No.: 11/046,418

(22) Filed: Jan. 28, 2005

(65) Prior Publication Data

US 2006/0174220 A1 Aug. 3, 2006

(51) Int. Cl.
*G06F 9/44* (2006.01)
(52) U.S. Cl. .................. 717/104; 717/105; 717/106; 717/107; 717/108; 717/109
(58) Field of Classification Search .......... 717/104–109
See application file for complete search history.

(56) References Cited

U.S. PATENT DOCUMENTS

| | | | |
|---|---|---|---|
| 4,652,427 A * | 3/1987 | Uchikawa et al. ........... 376/447 |
| 5,096,667 A * | 3/1992 | Fetcenko .................... 420/580 |
| 5,446,895 A * | 8/1995 | White et al. ................ 717/101 |
| 5,613,120 A * | 3/1997 | Palay et al. ................. 717/165 |
| 5,864,862 A * | 1/1999 | Kriens et al. ............ 717/103 R |
| 6,081,665 A * | 6/2000 | Nilsen et al. ................ 717/116 |
| 6,199,195 B1 * | 3/2001 | Goodwin et al. ............ 717/104 |
| 6,275,976 B1 * | 8/2001 | Scandura .................... 717/120 |
| 6,320,193 B1 * | 11/2001 | Morrison et al. ............ 250/393 |
| 6,385,763 B1 * | 5/2002 | Meyer et al. ................ 717/100 |
| 6,467,085 B2 * | 10/2002 | Larsson ...................... 717/165 |
| 6,895,409 B2 * | 5/2005 | Uluakar et al. ........... 707/104.1 |

* cited by examiner

*Primary Examiner*—Wei Y Zhen
*Assistant Examiner*—Qamrun Nahar

(57) ABSTRACT

Embodiments of the method and apparatus provide for a macroscopic model for a large system, such as a large software system, having large-scale behavior that considers a totality of the large system. Also provided are macroscopic attributes of the system. The macroscopic attributes are at least one of logical temperature, logical pressure, logical volume and entropy.

19 Claims, 3 Drawing Sheets

```
┌─────────────────────────────────────┐
│  MODELING A LARGE SOFTWARE SYSTEM BY │
│  TREATING THE LARGE SOFTWARE SYSTEM  │
│      AS A GAS IN A PHYSICAL SYSTEM   │
│                 301                  │
└─────────────────────────────────────┘
                  │
                  ▼
┌─────────────────────────────────────┐
│   IDENTIFING SOFTWARE VARIABLES IN THE│
│       LARGE SOFTWARE SYSTEM AS        │
│   CORRESPONDING TO MOLECULES IN THE   │
│   GAS, IMPACT INDEX OF VARIABLES AS   │
│   CORRESPONDING TO ENERGY LEVEL AND,  │
│  AVERAGE RANGE OF VALUES OF VARIABLES │
│   AS CORRESPONDING TO A NUMBER OF     │
│   POSSIBLE STATES IN AN ENERGY LEVEL  │
│                 302                   │
└─────────────────────────────────────┘
                  │
                  ▼
┌─────────────────────────────────────┐
│   THE LOGICAL SOFTWARE SYSTEM HAVING  │
│   LOGICAL VOLUME, LOGICAL PRESSURE,   │
│         LOGICAL TEMPERATURE           │
│                 303                   │
└─────────────────────────────────────┘
```

FIG. 3

MACROSCOPIC MODEL FOR LARGE SCALE SOFTWARE SYSTEM AND ITS BEHAVIOR

TECHNICAL FIELD

The present invention relates in general to modeling systems, and, more particularly, to a method and system that models a large-scale software system.

BACKGROUND OF THE INVENTION

Known attempts at evolving a software science have tried to capture certain properties of programs such as program size, program volume, complexity, etc. However, these do not shed much light on the working of the logical processes in a program. There have also been efforts to discipline the development of software to improve its error proneness and make its reliability converge to that of hardware by structuring and constraining the programs via architectural constraints, design methodologies, hardware-like paradigms, language and programming constructs, information hiding, structured design, object orientation, encapsulation, reuse, patterns, etc. Since the implementations of these methodologies prescribe distinct forms and procedures, it is difficult to determine the fundamental mechanisms by which they bring their respective benefits. The question, which arises then, is whether these are all fundamentally different or is there a common underlying basis? Turns out that there is a possible unification.

The large number of states generally possible in software compared to that in hardware systems makes the analysis of software systems very difficult. The rapid increase in the number of states with increase in size of software increases its complexity rapidly requiring transition from microscopic analysis to the analysis of behavior in the large or macroscopic behavior. Therefore, it is a drawback of the prior art that known attempts have not realized the above issue and therefore have not been successful at addressing the reliability of large software systems directly. In what follows, we present our attempts at trying to apply methods of statistical mechanics and information theory to conceptualize a large software scenario to evolve a common basis for construction of reliable software systems by constraining the states through which software traverses.

Thus, a need exists for a model for a large software system that helps in evaluating the macroscopic behavior of the system by representing it as a statistical ensemble of variables embedded in a logical environment that controls the microscopic behavior of the variables.

SUMMARY

The invention in one implementation encompasses an apparatus. In one embodiment, there is provided an apparatus comprising a statistical ensemble of variables embedded in a logical environment that controls the microscopic behavior of the variables; and macrocopic attributes that emerge from the microscopic behavior; and when the probability of the system being in a predefined state is high, the software is considered to be hardening.

In another embodiment, there is provided a macroscopic model of a large software system comprising large scale behavior that considers a totality of the large software system; and macroscopic attributes of the software system, the macroscopic attributes being at least one of logical temperature, logical pressure, logical volume and entropy.

In a further embodiment, there is provided a method for: modeling a large software system by treating the large software system as a gas in a physical system, the logical software system having logical volume, logical pressure, and logical temperature; and identifying software variables in the large software system as corresponding to molecules in the gas, impact index of variables as corresponding to energy level and, average range of values of variables as corresponding to a number of possible states in an energy level.

BRIEF DESCRIPTION OF THE DRAWINGS

Features of exemplary implementations of the invention will become apparent from the description, the claims, and the accompanying drawings in which:

FIG. 3 is a representation of one embodiment of exemplary logic flow for the apparatus of FIG. 1.

DETAILED DESCRIPTION

The particular values and configurations discussed in these non-limiting examples can be varied and are cited merely to illustrate an embodiment of the present invention and are not intended to limit the scope of the invention.

Complex systems are composed of a large number of parts, which interact and work as an integrated whole system. Familiar examples are: gas molecules moving about in a container, biological systems comprised of cells, networks of nerve cells, chemical reactions, cosmological systems, atmospheric and environmental systems, etc. To this list may be added software systems, which comprise of a large number of variables, functions, data structures, etc. All these systems may be viewed from two points of view, the microscopic view where the behavior of each little element is described and the macroscopic view where the behavior of the totality of the system is considered. Due to the large number of interacting parts, it is not possible in general to systematically determine the macroscopic behavior from the microscopic behavior. In making the transition from microscopic to macroscopic level, it is necessary to neglect certain details of the microscopic constituents and focus on processes leading to performance in the large. Removing the microscopic details enables one to use statistical descriptions for the microscopic entities and build macroscopic models based on this substratum. This was accomplished in physics through statistical mechanics where Boltzmann derived the macroscopic laws from microscopic laws by using statistical models. Shannon's information theory has been applied in a similar manner to many systems.

Figure 1:
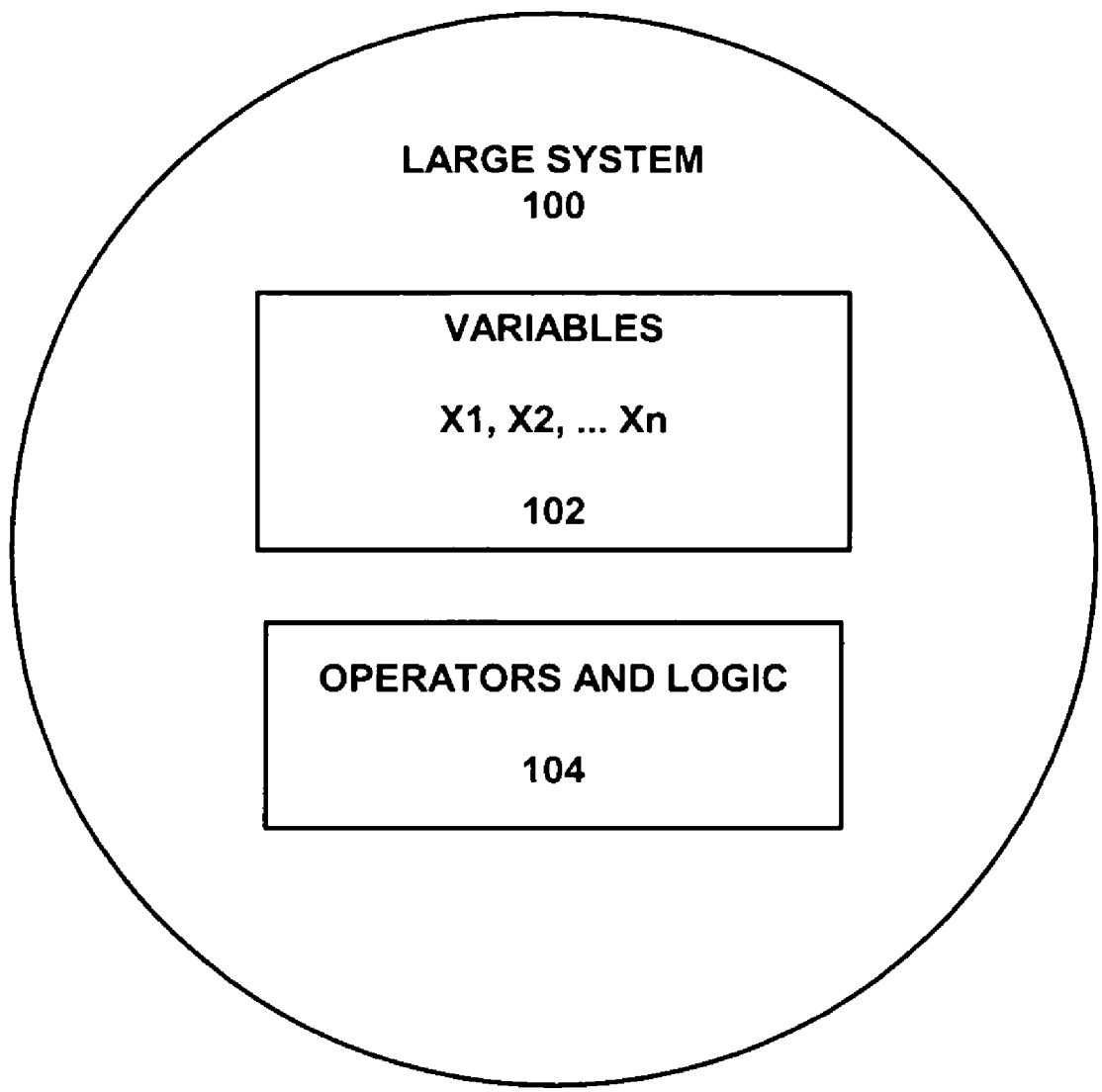
FIG. 1 is a representation of one implementation of an apparatus that comprises a large software system.

FIG. 1 is a representation of one implementation of an apparatus that depicts a large software system 100. Software may be a logical system 100 containing variables 102 and operators 104 that act on them. As a simplified model of large software, the software 100 may be considered as consisting of N variables 102 which with their specific values at any time represent an instance of the software in execution. The operators and the logic 104 may be treated as the glue, which creates the forces, which hold the variables 102 together and create an environment for interaction among them.

With this setting a state space may be constructed that is the Cartesian product of all values that every variable can assume. Thus the number of points in this N-dimensional state space may be determined by the combination of theoretically possible values of all variables. Depending upon the admissible execution paths however, not all of these states may ever be traversed. The variables may be named, $x_1, x_2, x_3, \ldots, x_N$. For large software N is very large. Any one of the variables $x_i$ can take $g_i$ values, or in other words, has $g_i$ states. Thus, $x_1$ has $g_1$ possible states
$x_2$ has $g_2$ possible states
    etc.

A parallel may now be drawn between these variables and the molecules suspended in a gas. In the statistical mechanics formulation of the model of molecules in a gas, the molecules are defined to have various energy levels. In a similar manner, in software, every variable may have an impact on the performance of the program depending upon a number of factors including, its span (local, global, etc.), sensitivity of the system to it (dependent upon the operations on it), and upon the frequency of its use in the program. The essence of this may be captured by imposing an indicator on the potential impact of a variable on the performance of the system during a given time interval. The impact of a variable may be indicative of the difference in the behavior of the system with and without a change to that variable in a give time interval. Impact of variables may be evidenced by their action on states to effect transition. Thus there may be variables with low, medium or high impact. There is now a transitioning from the software as a program to the logical system that has an operational behavior. It may be assumed that there are discrete levels of impact of a variable on the system. Thus associated with a variable $x_i$ there is an impact level $\epsilon_i$. It is seen that more than one variable can have an impact of a similar magnitude at the same time. Let us say $n_j$ variables are at an impact level $E_j$ at a given time. Thus at a given time there are, $n_1$ variables at an impact level $E_1$
$n_2$ variables at an impact level $E_2$
    etc.

And, $N=n_1+n_2+\ldots$

Note that the number of variables having a certain impact is dynamic. Thus while at a certain instant there are $n_j$ variables at an impact level $E_j$, at a different instant there may be $m_j$ variables at the same impact level $E_j$. Also at any given impact level $E_j$ there are admissible number of values $g_{x1j}, g_{x2j}$, etc., for variables $x_1, x_2, \ldots x_N$. Let $G_j$ be the average number of admissible values at this impact level $E_j$. Thus on an average there are $G_j$ values possible for the variables that cause an impact $E_j$. Since the macroscopic view will always be concerned with average values and distributions henceforth $g_j$ will be used to denote $G_j$. Using average values and distributions signifies ignoring the distinction between the individual variables at the microscopic level in order to rise up to the macroscopic level.

In this setting if the software variables are identified as corresponding to the molecules, impact index of variables as corresponding to the energy level and, the average range of values of variables as corresponding to the number of possible states in an energy level, the above model of software ensemble is now identical to Boltzmann's model of molecules of a gas in statistical mechanics. Corresponding to the enclosure of a gas the I/O interfaces of software define the boundaries for macroscopic interaction with the outside world.

A macroscopic model characterizes the behavior in the large that considers the totality of the system. In such a model of software, there may be analogues of the macroscopic quantities commonly observed in thermodynamics namely temperature, pressure, volume and entropy. There may be considered only an equilibrium state where the software continues to execute and does not halt or suffer a catastrophe. Under these conditions, applying statistical mechanics framework, establishes the following cardinal relationships for the distribution of the variables with respect to the impact levels.

$$n_i = (N/z) g_i \cdot \exp(-\beta \cdot E_i) \qquad (1)$$

and $$z = \sum_i g_i \cdot \exp(-\beta \cdot E_i) \qquad (2)$$

where
    N=total number of variables
    z=Partition function (we retain this term from thermodynamics)
    $\beta$=constant dependent upon the environment
    $g_i$=average number of possible states at the impact level $E_i$ The above equations form a major part of an entire model and allow many new concepts to be extracted.

In equation 2, z the sum of state occupancies over all states is a function only of $\beta$. The constant $\beta$ is identified in thermodynamics as the inverse of absolute temperature multiplied by a constant. Raising temperature imparts heat energy to a particle from its surroundings. In a similar manner in software, the extent of influence of the environment on the given variable i.e., the dependency corresponds to the concept of temperature. Thus dependency determines the impact of the environment on a variable, which in turn increases the potential impact of the variable. This can be brought about by changing the constraints on the variables, changing the neighboring states and having this cascaded from changes effected to the input variables of a program or through an initialization process to give the variables specific values. Thus, an uninitialized variable is a potential hot spot. On the other hand placing constraints on variables, which will limit their impact on other variables, can reduce the temperature. The average dependency of all variables may be referred to as the logical temperature of the system.

Using the relationship between volume and the partition function, z being the sum of $\exp(-\beta.E_i)$ over all admissible states, correspondingly the logical volume may be defined to be the sum of the potential impact contribution over all states admissible for traversal by a variable.

$$V = \sum_i s_i \cdot \varepsilon_i \qquad (3)$$

$$= \varepsilon \cdot \sum_i s_i \qquad (4)$$

where,
    V=logical volume
    $s_i$=the number of system states traversed by the variable $x_i$
    $\epsilon_i$=potential impact of the variable $x_i$
    $\epsilon$=average potential impact of all variables
    i=index enumerating all the variables Logical pressure may be defined to be the density of variables with respect to the total number of states traversed.

$$P = N \bigg/ \left( \sum_{all\text{-}var} s_i \right) = N \cdot \varepsilon / V \qquad (5)$$

where $\varepsilon$, V, and N are as defined above in (3) and (4).

Thus, a high pressure means a large number of variables but relatively small number of system states traversed. This may happen in various situations. A simple example is to tighten the data types on variables constraining them to a smaller set of values resulting in smaller number of system states. One situation is where a small number of variables interact intensely with each other within groups but there is relatively little interaction among groups. Here the number of states may be reduced by making the groups (these could be modules) independent while there is tight coupling internally. It appears as though the groups are kept tightly closed by high pressure.

The concept of entropy is common to information theory and statistical mechanics, and the same applies to software ensembles. This physical entropy describes the amount of disorder in the ensemble and is a syntactic entity. This is different from the "Algorithmic Entropy" of the logical algorithms, which form the programs. In intelligent information processing systems that involve meaning associations there is a transformation between the physical entropy and algorithmic entropy. The role of entropy in the present context is that a large number of variables as well as a large number of admissible states contribute to larger entropy. Conversely reduction in entropy means a reduction in the number of states or a greater probability of certain states, which brings about a more certain definition of the system behavior. Reducing the interdependencies between variables reduces the state transition probabilities and correspondingly the average number of states traversed.

Logical pressure, volume, temperature and entropy are interrelated. Relationships between these macroscopic parameters show a similarity with the gas laws. Although the contention here is not to equate the performance of software with the physical systems but rather attempt to determine macroscopic properties that may be observed in very large software systems. In this context the following may be observed.

1. Equations 4 and 5 show that for constant logical temperature the logical pressure and volume are inversely related as in Boyle's law for gases. Thus in a program where the local activity is increased while the global activity is reduced, keeping the total activity constant, signifies an increase in logical pressure, the number of states traversed decreases leading to a software with reduced logical volume.

2. When logical temperature is decreased, both the logical volume as well as the logical pressure decrease as in the generalized gas law. Thus when interdependencies of variables are reduced, the potential impacts $\varepsilon_i$ of the variables are correspondingly decreased leading to a decrease in logical volume and reduced logical pressure. Thus by reducing the span and dependencies of variables in data abstraction the logical pressure and logical volume may be simultaneously reduced. This is accompanied by a reduction in the physical entropy and a consequent reduction in the related algorithmic entropy of the collection of variables.

3. As a consequence of the above, if the logical temperature and the logical volume continue to decrease, the resulting entropy decrease will result in an increasingly compact algorithm finally culminating in a very compact one, which is equivalent to an incompressible state such as a liquid or a solid.

When a gas liquefies or solidifies, the uncertainty of finding a particle at a certain position is reduced implying a reduction in the number of states of the system. Correspondingly for software, when the probability of the system being in a predefined state is high, the software is said to be hardening. High reliability directly translates to a high probability for the system to be in a predefined state and approaches hard status regardless of how it is implemented. Thus starting from a raw software which has a very large number of admissible system states, if suitable constraints of various types are used to restrict the variables during execution such that the number of states traversed by the system is reduced, it will cause the system to harden. This phenomenon is referred to as software hardening.

Hardening may be accomplished in various ways. Information hiding, modularization, programming constructs, object oriented programming, component reuse, etc., all lead to the same fundamental goal of software hardening through reduction in the number of actually admissible states.

The present system and method provide a novel model for large software based on statistical mechanics and information theory. This paradigm leads to the concepts of logical volume, logical pressure and logical temperature, and enables the visualization of the effects of various constraints on the execution states of software. The software may be treated like a gas in a physical system. Thus it is seen that reliability improvements may be obtained through reduction of occupied states, which may in turn be accomplished by many different approaches. This is termed software hardening to signify convergence with hardware properties.

Figure 2:
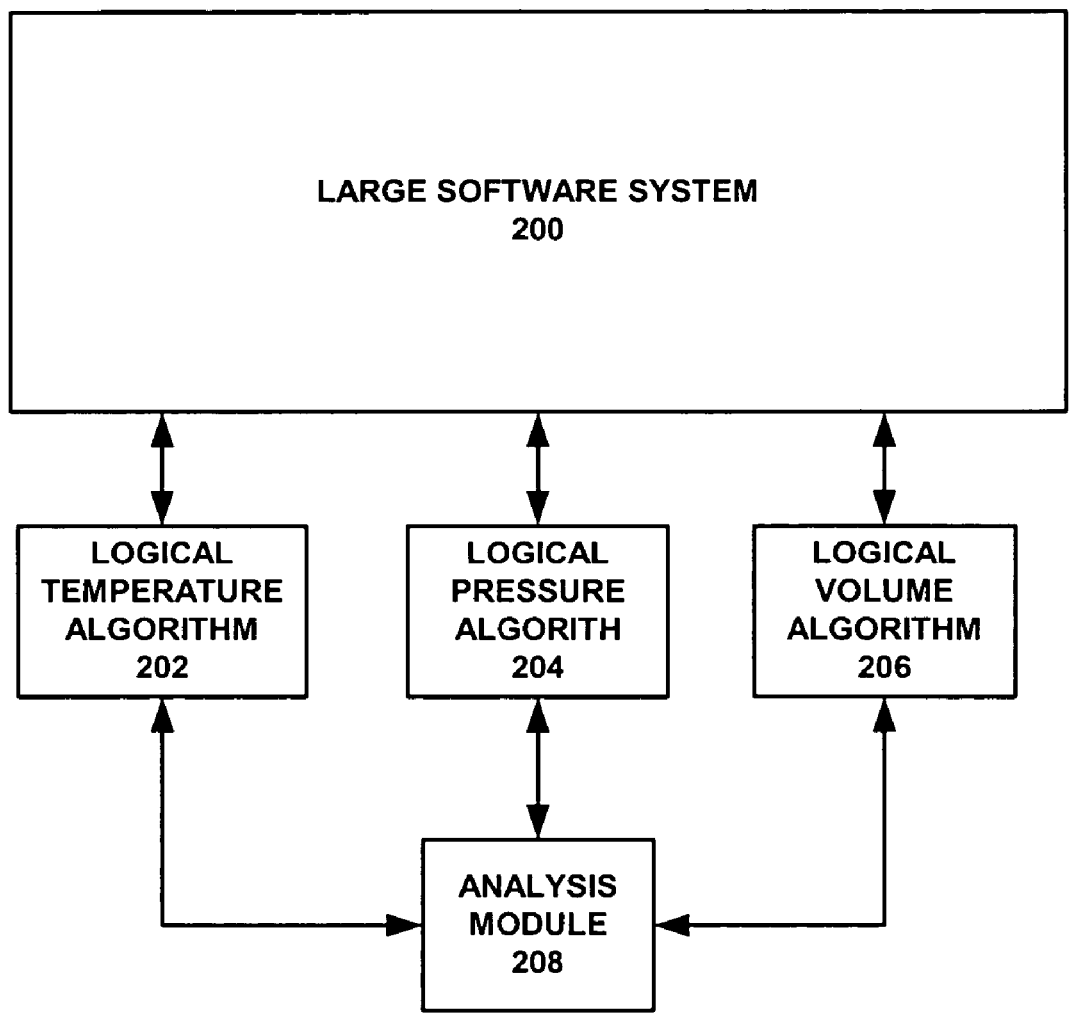
FIG. 2 is a representation of one implementation of an apparatus that comprises algorithms for determining the hardening of a large software system.

FIG. 2 is a representation of one implementation of an apparatus that has algorithms for determining the hardening of a large software system. An analysis module 204 may be used to analyze the large software system 200 via a logical temperature algorithm 202, a logical pressure algorithm 204 and a logical volume algorithm 206. These algorithms implement the concepts of logical volume, logical pressure and logical temperature as described above.

FIG. 3 is a representation of one embodiment of exemplary logic flow for the apparatus of FIG. 1. This embodiment of the present method comprises: modeling a large software system by treating the large software system as a gas in a physical system, (301); and identifying software variables in the large software system as corresponding to molecules in the gas, impact index of variables as corresponding to energy level and, average range of values of variables as corresponding to a number of possible states in an energy level (302); this yields the definition of the logical software system having logical volume, logical pressure, and logical temperature (303).

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus for modeling a large software system, comprising:
   a complex system, representative of the software system, composed of a large number of parts, which interact and work as an integrated whole system;
   a processor;
   a memory, coupled to the processor, the memory storing instructions adapted to be executed by the processor, the instructions including:
   providing a logical system having a number of variables and operators that act on the variables, and a state space that is a product of all values that every variable assumes and that has a dimensional state which is a combination of possible values of the variables;
   determining impacts of the variables on states to effect state transitions;
   imposing an indicator on the impacts of variables on performance of the system during a given time interval; and
   reducing interdependencies between variables to reduce state transition probabilities and correspondingly an average number of states traversed thereby improving reliability of the system through reduction of occupied states; and
   wherein a statistical ensemble of variables is embedded in a logical environment that controls microscopic behavior of the variables that is representative of the complex system composed of a large number of parts, which interact and work as an integrated whole system; and
   wherein macroscopic attributes are derived from the microscopic behavior; and
   wherein, when the probability of the complex system being in a predefined state is high, the software is considered to be hardening.

2. The model according to claim 1, wherein macroscopic attributes of the software system are at least logical volume, logical pressure, and logical temperature and are respectively analogous to volume, pressure, and temperature in a physical gas system.

3. The model according to claim 1, wherein the software hardening is a framework for conceptual unification of software reliability improvement techniques including at least one of modularity, object orientation, and software reuse.

4. A macroscopic model of a large software system, comprising:
   a processor;
   a memory, coupled to the processor, the memory storing instructions adapted to be executed by the processor, the instructions including:
   providing a logical system having a number of variables and operators that act on the variables, and a state space that is a product of all values that every variable assumes and that has a dimensional state which is a combination of possible values of the variables;
   determining impacts of the variables on states to effect state transitions;
   imposing an indicator on the impacts of variables on performance of the system during a given time interval; and
   reducing interdependencies between variables to reduce state transition probabilities and corresponding an average number of states traversed thereby improving reliability of the system through reduction of occupied states.

5. The model according to claim 4, wherein the system has a plurality of variables, and wherein the logical temperature of the system is an average dependency of all variables in the system.

6. The model according to claim 4, wherein for constant logical temperature the logical pressure and logical volume are inversely related.

7. The model according to claim 4, wherein when local activity of the software system is increased while global activity of the software system is reduced, keeping total activity constant, signifies an increase in logical pressure, then number of states traversed decreases leading to a software with reduced logical volume.

8. The model according to claim 4, wherein when logical temperature is decreased, both the logical volume and the logical pressure decrease.

9. The model according to claim 4, wherein when interdependencies of variables are reduced, potential impacts of the variables on each other are correspondingly decreased leading to a decrease in logical volume and reduced logical pressure.

10. The model according to claim 4, wherein decreasing the logical temperature and the logical volume, results in decreasing the entropy.

11. The model according to claim 4, wherein the logical volume is a sum of a potential impact contribution over all states admissible for traversal by a variable in the system.

12. The model according to claim 4, wherein the logical pressure is the density of the variables with respect to a total number of states traversed.

13. The model according to claim 4, wherein apparatus further includes a logical temperature algorithm that identifies the logical temperature.

14. The model according to claim 4, wherein apparatus further includes a logical pressure algorithm that identifies the logical pressure.

15. The model according to claim 4, wherein apparatus further includes a logical volume algorithm that identifies the logical volume.

16. A macroscopic model of a large software system, comprising:
   a complex system composed of a large number of parts, which interact and work as an integrated whole system;
   a processor;
   a memory, coupled to said processor, said memory storing instructions adapted to be executed by said processor, the instructions including:
   providing a logical system having a number of variables and operators that act on the variables, and a state space that is a product of all values that every variable assumes and that has a dimensional state which is a combination of possible values of the variables;
   determining impact levels of the variables on states to effect state transitions;
   imposing an indicator on the impacts of variables on performance of the system during a given time interval; and
   reducing interdependencies between variables to reduce state transition probabilities and correspondingly an average number of states traversed thereby improving reliability of the system through reduction of occupied states;
   wherein relationships are formed for distribution of $n_i$ variables with respect to impact levels $E_i$ of the large software system that is representative of the complex system composed of a large number of physical parts, which interact and work as an integrated whole system;

$$n_i = (N/z) g_i \cdot \exp(-\beta \cdot E_i)$$

and $$z = \sum_i g_i \cdot \exp(-\beta \cdot E_i)$$

where
- N=total number of variables
- z=Partition function (we retain this term from thermodynamics)
- β=constant dependent upon the environment
- $g_i$=average number of possible states at the impact level $E_i$.

17. The model according to claim 16, wherein the logical volume is a sum of potential impact contribution over all states admissible for traversal by a variable;

$$V = \sum_i s_i \cdot \varepsilon_i$$

$$= \varepsilon \cdot \sum_i s_i$$

where,
- V=logical volume
- $s_i$=the number of system states traversed by the variable $x_i$
- $\epsilon_i$=potential impact of the variable $x_i$
- $\epsilon$=average potential impact of all variables
- i=index enumerating all the variables.

18. The model according to claim 16, wherein the logical temperature of the system is an inverse of the constant β and is a function of an average dependency of all variables in the system.

19. The model according to claim 16, wherein the logical pressure is the density of the variables with respect to a total number of states traversed;

$$P = N \bigg/ \bigg( \sum_{all\,var} s_i \bigg) = N \cdot \varepsilon / V$$

where,
- V=logical volume
- $s_i$=the number of system states traversed by the variable $x_i$
- $\epsilon_i$=potential impact of the variable $x_i$
- $\epsilon$=average potential impact of all variables
- i=index enumerating all the variables.

* * * * *